United States Patent
Senigaram

(10) Patent No.: US 11,748,347 B2
(45) Date of Patent: Sep. 5, 2023

(54) RESOLVING INCOMPATIBLE COMPUTING SYSTEMS

(71) Applicant: Ford Global Technologies, LLC, Dearborn, MI (US)

(72) Inventor: Vijetha Senigaram, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 17/324,176

(22) Filed: May 19, 2021

(65) Prior Publication Data

US 2022/0374429 A1 Nov. 24, 2022

(51) Int. Cl.
*G06F 16/2453* (2019.01)
*G06F 16/25* (2019.01)
*G06F 16/28* (2019.01)
*G06F 16/22* (2019.01)

(52) U.S. Cl.
CPC ........ *G06F 16/24535* (2019.01); *G06F 16/22* (2019.01); *G06F 16/24537* (2019.01); *G06F 16/258* (2019.01); *G06F 16/284* (2019.01)

(58) Field of Classification Search
CPC ............... G06F 16/24535; G06F 16/22; G06F 16/24537; G06F 16/284; G06F 16/258
See application file for complete search history.

(56) References Cited

U.S. PATENT DOCUMENTS

| | | | | |
|---|---|---|---|---|
| 7,257,079 | B1* | 8/2007 | Bachrach | .......... H04L 12/40032 370/230 |
| 2005/0080803 | A1* | 4/2005 | Sauermann | ........... G06F 16/258 |
| 2005/0086201 | A1* | 4/2005 | Weddeling | ................ G06F 8/38 |
| 2005/0184886 | A1* | 8/2005 | Fauque | ................ G06F 40/126 341/50 |
| 2008/0229289 | A1 | 9/2008 | Nauman et al. | |
| 2009/0171997 | A1* | 7/2009 | Challapalli | ........... G06F 16/258 |
| 2010/0095283 | A1* | 4/2010 | Lee | ........... G06F 8/76 717/137 |
| 2013/0090172 | A1* | 4/2013 | Kim | ........ A63F 13/12 463/42 |
| 2016/0062954 | A1* | 3/2016 | Ruff | ...................... G06F 40/205 715/249 |
| 2017/0200153 | A1* | 7/2017 | Hewitt | .................. G06F 16/258 |
| 2019/0095437 | A1 | 3/2019 | Park et al. | |

OTHER PUBLICATIONS

Matlapudi, A., et al., "Challenge! Reading Mainframe Hex Delimited Flat File Where Each Line Has Different Layout," Pharmacy Informatics, PerformRx, The Next Generation PBM, 2010, 7 pages.

* cited by examiner

*Primary Examiner* — Richard L Bowen
(74) *Attorney, Agent, or Firm* — Brandon Hicks; Bejin Bieneman PLC

(57) ABSTRACT

Source data rendered as a string of hexadecimal data representing a set of Extended Binary Coded Decimal Interchange Code (EBCDIC) data, and a data layout description defining a record in the source data that includes a plurality of fields, are obtained. Respective hexadecimal lengths of the fields based on a source data length of each field and a source datatype of each field are determined. Hexadecimal sub-strings are extracted from the hexadecimal string based on the hexadecimal lengths and source datatypes of the fields. At least some of the hexadecimal sub-strings are converted to a target format. The sub-strings are output in the target format.

16 Claims, 4 Drawing Sheets

RESOLVING INCOMPATIBLE COMPUTING SYSTEMS

BACKGROUND

Different computing systems can store data in different formats. Data formatted or storage in a first computing system may not be interpretable or readable in a second computing system. For example, Extended Binary Coded Decimal Interchange Code (EBCDIC) is an encoding scheme, or format, designed for and used in mainframe computers; other computing systems or applications typically are not able to read or interpret EBCDIC data.

DETAILED DESCRIPTION

Figure 1:
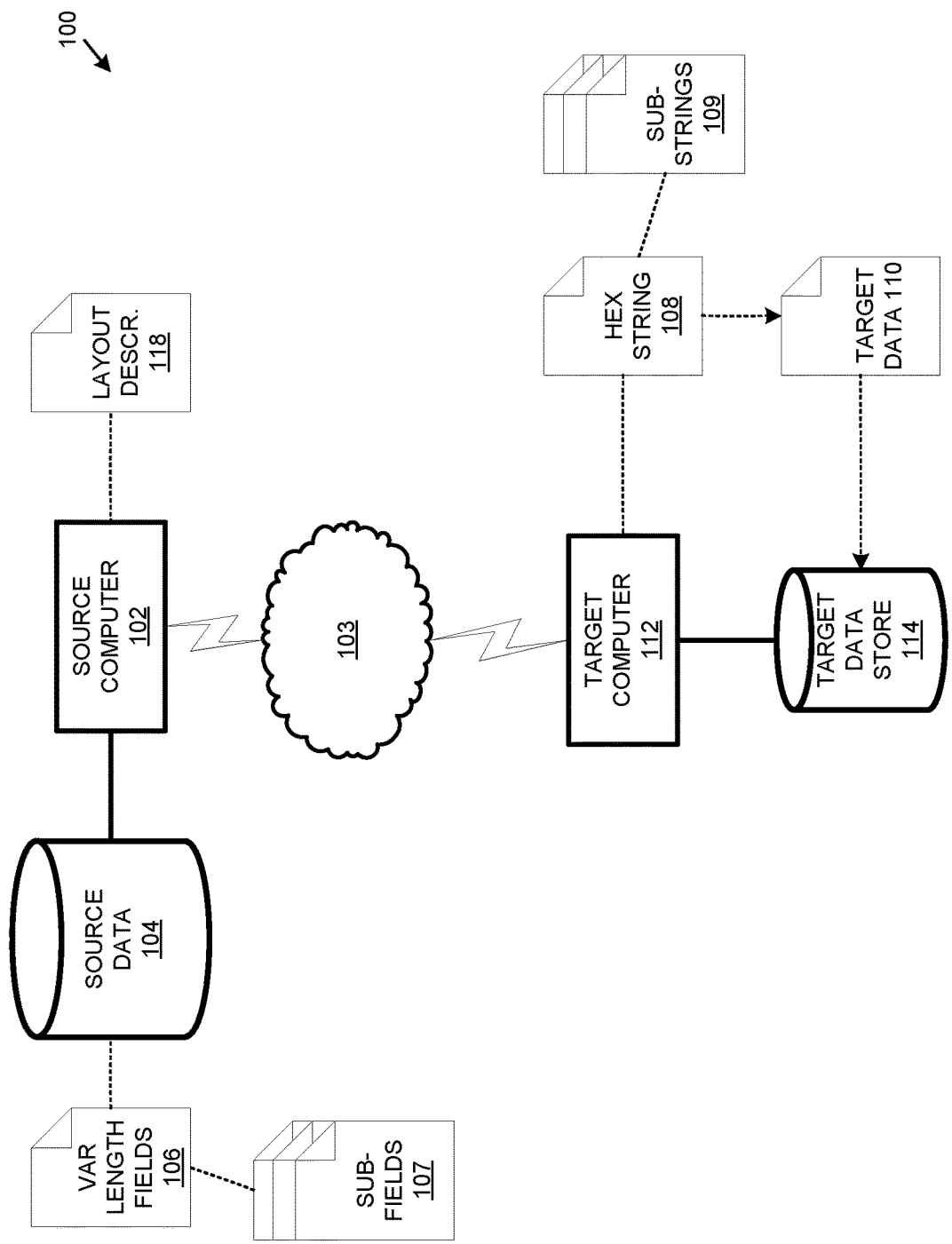
FIG. 1 is a block diagram of an example system for providing and interpreting data from a source computer to a target computer.

A method comprises receiving source data rendered as a string of hexadecimal data representing a set of Extended Binary Coded Decimal Interchange Code (EBCDIC) data, and a data layout description defining a record in the source data that includes a plurality of fields; determining respective hexadecimal lengths of the fields based on a source data length of each field and a source datatype of each field; extracting hexadecimal sub-strings from the hexadecimal string based on the hexadecimal lengths and source datatypes of the fields; converting at least some of the hexadecimal sub-strings to a target format; and outputting the sub-strings in the target format.

The method can further comprise determining the hexadecimal lengths of the fields includes converting a source data field length to a hexadecimal length based on a specified length of the respective source data field and a stored rule for converting a number of bytes of the source data field to a hexadecimal length.

The record can be a first record that is one of a plurality of records defined in the data layout description, and the plurality of fields can be a first plurality of fields; wherein a respective plurality of fields is defined for each record in the plurality of records; and wherein the at least one record in the plurality of records includes multiple occurrences of the plurality of fields. The method can further comprise determining respective hexadecimal lengths of one occurrence in the plurality of fields in the hexadecimal string based on the respective hexadecimal lengths of fields in the respective records of the plurality of records. The method can further comprise, after extracting sub-strings from the hexadecimal string based on the hexadecimal length of the one occurrence, then extracting additional sub-strings from the hexadecimal string based on the hexadecimal length of the one occurrence. Extracting sub-strings from the hexadecimal string based on the hexadecimal lengths of the one occurrence can include: extracting a first set of sub-strings based on the hexadecimal length of the one occurrence, determining that processing of the first set of sub-strings is complete based on the hexadecimal length of the one occurrence, and extracting a second set of sub-strings based on the hexa- decimal lengths of the one occurrence; wherein converting at least some of the sub-strings to the target format includes converting the second sub-strings to the target format.

The target format can be American Standard Code for Information Interchange (ASCII). Outputting the sub-strings in the target format can include storing the sub-strings as one or more records in a relational database. Outputting the sub-strings in the target format can include storing the sub-strings as one or more records in a Hadoop Distributed File System.

A system comprises a computer that includes a processor a memory, the memory storing instructions executable by the processor for: receiving source data rendered as a string of hexadecimal data representing a set of Extended Binary Coded Decimal Interchange Code (EBCDIC) data, and a data layout description defining a record in the source data that includes a plurality of fields; determining respective hexadecimal lengths of the fields based on a source data length of each field and a source datatype of each field; extracting hexadecimal sub-strings from the hexadecimal string based on the hexadecimal lengths and source datatypes of the fields; converting at least some of the hexadecimal sub-strings to a target format; and outputting the sub-strings in the target format.

Determining the hexadecimal lengths of the fields can include converting a source data field length to a hexadecimal length based on a specified length of the respective source data field and a stored rule for converting a number of bytes of the source data field to a hexadecimal length.

The record can be a first record that is one of a plurality of records defined in the data layout description, and the plurality of fields can be a first plurality of fields; wherein a respective plurality of fields is defined for each record in the plurality of records; and wherein the at least one record in the plurality of records includes multiple occurrences of the plurality of fields. The instructions can further include instructions for determining respective hexadecimal lengths of one occurrence in the plurality of fields in the hexadecimal string based on the respective hexadecimal lengths of fields in the respective records of the plurality of records. The instructions can further include instructions for, after extracting sub-strings from the hexadecimal string based on the hexadecimal length of the one occurrence, then extracting additional sub-strings from the hexadecimal string based on the hexadecimal length of the one occurrence. Extracting sub-strings from the hexadecimal string based on the hexadecimal lengths of the one occurrence can include: extracting a first set of sub-strings based on the hexadecimal length of the one occurrence, determining that processing of the first set of sub-strings is complete based on the hexadecimal length of the one occurrence, and extracting a second set of sub-strings based on the hexadecimal lengths of the one occurrence; wherein converting at least some of the sub-strings to the target format includes converting the second sub-strings to the target format.

The target format can be American Standard Code for Information Interchange (ASCII). Outputting the sub-strings in the target format can include storing the sub-strings as one or more records in a relational database. Outputting the sub-strings in the target format can include storing the sub-strings as one or more records in a Hadoop Distributed File System.

Figure 2:
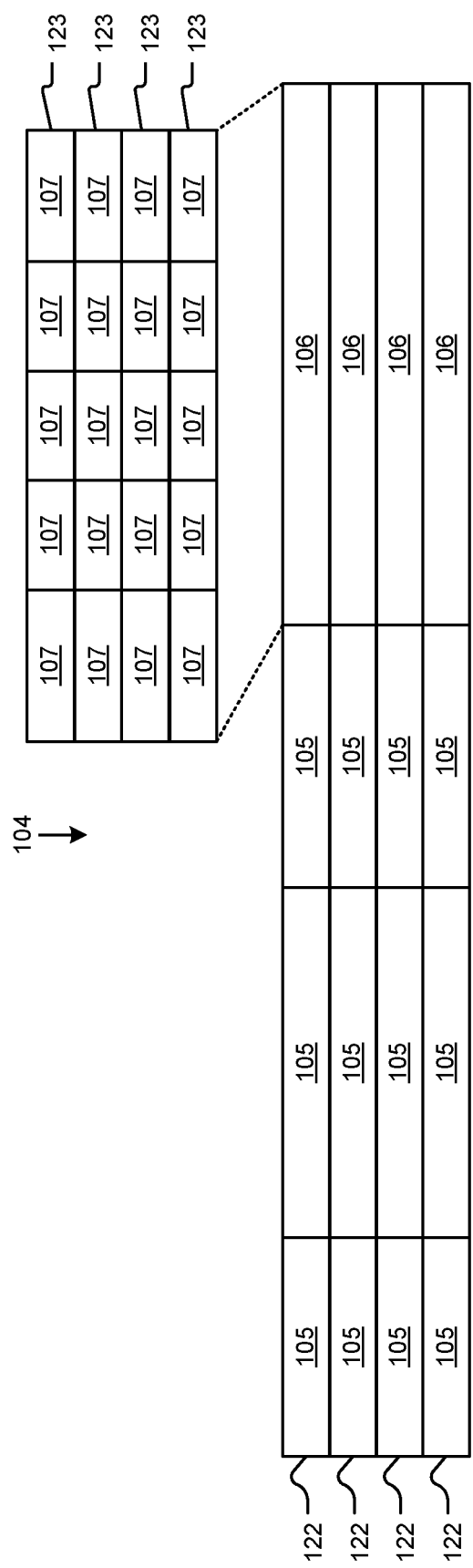
FIG. 2 is a block diagram of an example set of source data.

Referring to FIGS. 1-2, an example data provisioning system 100 for providing source data 104, including one or more fixed length fields 105 and variable length fields 106, from a data store associated with a source computer 102 to a target computer 112. The source data 104, including the variable length field(s) 106, can be rendered from a first (or source) format of the source computer 102 to a second (or target) format.

A data layout description 118 may provide certain information about source data 104, i.e., metadata, including a length and data type of a fixed length field 105, and lengths, datatypes, and numbers of occurrences, and order of presentation, of sub-fields 107 in variable length fields 106. The layout description 118 can be provided according to a conventional copybook or the like that specifies a format of variable length fields 106, for example. The source format is typically a format native to and provided from the source computer 102, e.g., Extended Binary Coded Decimal Interchange Code (EBCDIC) format, that can be represented as a string of codes represented as hexadecimal numbers, i.e., a field 106 of source data 104 can be encoded according to EBCDIC. EBDIC data such as included in a variable length field 106 can be provided as a hexadecimal string 108. Sub-strings 109 in the string 108 can be determined corresponding to the sub-fields 107. Lengths of the sub-strings 109 can be determined based on a length and data type of the sub-fields 107 provided in the layout description 118, and the string 108 including sub-strings 109 can then be converted to a desired format, such as a readable format such as American Standard Code for Information Interchange (ASCII). That is, the target format advantageously facilitates providing the EBCDIC source data 104 in the target format for use by the target computer 112, e.g., for the target computer 112 to provide from a target data store 114 for various systems and/or applications.

For example, a set of source data 104 could include a plurality of records 122 (see FIG. 2) from a source data store such as an IBM DB2® database, each of the records 122 including columns or fields that are respectively either fixed length fields 105 or variable length fields 106. The variable length fields 106 can in turn respectively include a plurality of sub-fields 107 (that in turn, as described further below, may be of various datatypes and/or lengths. To facilitate use of EBCDIC data, i.e., to provide a set of target data 110 that includes the EBCDIC data from a variable length field 106 in a readable and/or usable format, as disclosed herein, a target computer 112 can receive and/or represent the EBCDIC variable length field 106 as a hexadecimal string 108, and can then extract sub-strings 109 from the hexadecimal string 108 that can be rendered in an interpretable or readable format (e.g., ASCII).

In an example, a set, e.g., a table (e.g., from a relational database such as DB2 or the like), of source data 104 could be specified with a plurality of records 122. For example, a record 122 could include fields 105, 106, as follows:

First fixed field 105: "Name," string, 4 bytes,

Second fixed field 105: "Amount," number, 2 bytes,

Third fixed field 105: "ID No.," number, 4 bytes,

Fourth fixed field 105: "State," string, 4 bytes,

Variable field 106: "Detail," Occurs X (e.g., 100) times, includes:

Date, number,

Time, number,

Account number,

Description, string,

For example, a data layout description 118 could specify a variable field 106 as shown in Table 1:

TABLE 1

| 10 WS-DETAIL OCCURS 100 TIMES | | | | |
|---|---|---|---|---|
| 20 | Date | PIC | S9(9) | COMP |
| 20 | Time | PIC | S9(4) | COMP |
| 20 | Account | PIC | S9(4) | COMP |
| 20 | Desc | PIC | X(10) | |

As can be seen, after the level identifiers, i.e., the numbers 10 and 20, data about the field 106 and sub-fields 107 are provided. The above description specifies that the detail field 106 can occur up to 100 times. Further, the names of the respective sub-fields 107, are provided: date, time, account, and description (desc). "PIC," i.e., this example includes conventional COBOL picture clauses, means that a data type will be specified, including a length and type of data as shown in the rightmost columns of Table 1.

Table 2 illustrates example records 122 of a source data 104 table continuing the above example including the layout illustrated in Table 1, the records 122 thus including fixed length fields 105 and a variable length field 106, including data as follows:

TABLE 2

| Name | Amount | ID no. | State | Detail |
|---|---|---|---|---|
| John | 1500 | 150 | MI | 01343EF1041F1A84000000000000C293A48501343EF50 5491D9000000000000000D9858401343EF90677223D0 000000000C79985859501343EFA04082310000000000D 7A499979385 |
| Cathy | 1000 | 200 | MI | 013461B904B504BC000000000000000D9858401346227 01AE09820000000000E68889A385 |
| Joe | 2000 | 300 | MI | 013417EF044C1EBB00000000E885939396A6013417F4015E2 24A00000000D69981958785013417FE052317050000000000 0C799858595 |

The "Detail" column, i.e., a variable length field 106, e.g., a field having a VarChar data type in source data 104, is shown as an EBCDIC hexadecimal string 108. This depiction is for illustrative purposes; a variable length field 106 typically would be stored as part of source data 104 according to EBCDIC encoding and then converted to a hexadecimal string 108 representing EBCDIC data after being extracted or provided from the source data 104 store; it will be understood that EBCDIC data typically is not stored natively as a hexadecimal string in source data 104.

In the example of Table 2, the "Detail" field 106 in each record 122 can include multiple occurrences or iterations 123 of sets of sub-fields 107. Each iteration 123 of the "Detail" field 106 in this example, when EBDIC is represented in hexadecimal, has a hexadecimal length of 36 characters (based on a byte length of 18 bytes; see Table 5) and, conveniently for this explanation, happens to begin with the string "0134." For example, a hexadecimal substring 109 representing a first iteration 123 of variable length fields 106 represented in a hexadecimal string 108 for "John" is "01343EF1041F1A84000000000000C293A485." (The first row of Table 3 below shows this string converted to an ASCII format.) For the "John" record 122 in Table 2, the "Detail" field 106 includes four iterations 123 of the set or group of sub-fields 107, the hexadecimal length of one iteration being calculated to be 36 characters (see Table 5); there are two iterations 123 of the set or groups of sub-fields 107 for the "Cathy" record 122, and three iterations 123 of the set or groups for the "Joe" record 122. The variable length field 106 in this example includes four sub-fields 107. However, when the variable length field 106 is presented as an EBCDIC hexadecimal string 108, neither hexadecimal substrings formed of substrings 109 to represent respective iterations of sub-fields 107 nor individual sub-strings 109 corresponding to individual sub-fields 107 are delimited or otherwise specified in the EBCDIC string, as illustrated in Table 2. However, as described herein, based in part on determining hexadecimal lengths of the sub-strings, based on lengths provided for sub-fields 107, it is possible to extract sub-strings 109 from the Hexadecimal string (108) representing the EBCDIC source data 104, corresponding to sub-fields 107 of a field 106 in a record 122.

Accordingly, continuing the above example, the records 122, once sub-strings 109 are extracted from EBCDIC string for the details field 106, could be expanded as follows to yield expanded records 124 (see FIG. 3):

TABLE 3

| Name | Amt | ID No. | State | Date | Time | Acct. | Descr. |
|---|---|---|---|---|---|---|---|
| John | 1500 | 150 | MI | 2020 Dec. 1 | 1055 | 6788 | Blue |
| John | 1500 | 150 | MI | 2020 Dec. 5 | 1353 | 7568 | Red |
| John | 1500 | 150 | MI | 2020 Dec. 9 | 1655 | 8765 | Green |
| John | 1500 | 150 | MI | 2020 Dec. 10 | 1032 | 8976 | Purple |
| Cathy | 1000 | 200 | MI | 2021 Jan. 5 | 1205 | 1212 | Red |
| Cathy | 1000 | 200 | MI | 2021 Feb. 15 | 430 | 2434 | White |
| Joe | 2000 | 300 | MI | 2019 Dec. 15 | 1100 | 7867 | Yellow |
| Joe | 2000 | 300 | MI | 2019 Dec. 20 | 350 | 8778 | Orange |
| Joe | 2000 | 300 | MI | 2019 Dec. 30 | 1315 | 5765 | Green |

Figure 3:
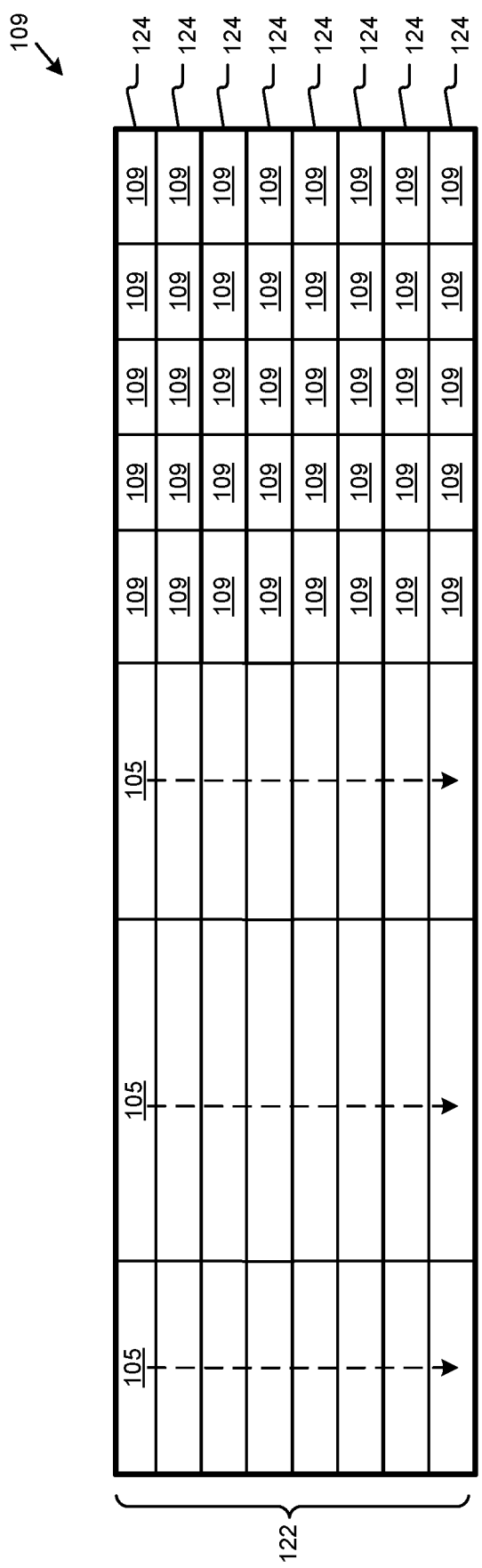
FIG. 3 is a block diagram of an example set of target data.

As can be seen, and referring also to FIG. 3, discussed further below, the "John" record 122 is expanded to four expanded records (124) because the field 106 for that record 122 includes four iterations 123 of the set of sub-fields 107 included in that field 106; the "Cathy" record is expanded to two expanded records 124 because the field 106 for that record 122 includes two iterations 123 of the set of sub-fields 107 included in that field 106; and the "Joe" record 122 was expanded to three expanded records 124 because the field 106 for that record 122 includes three iterations 123 of the set of sub-fields 107 included in the field 106.

Table 2 thus illustrates a set of records 122 in source data 104 as shown in FIG. 2. (Only three records 122 are shown for ease of illustration, but a table of source data 104 could include thousands or millions of records.) Further, FIG. 3 represents the records 122 expanded to respective iterations 123 as illustrated in Table 3. That is, FIG. 3 shows a hexadecimal string 108 processed to determine sub-strings 109 (shown converted to ASCII in Table 3) corresponding to respective sub-fields 107 in a respective variable length field 106 for a record 122 resulting in multiple expanded records 124 in target data 110 for that record 122.

An expanded record 124 in the context of this document is an instance of a set of data from a record 122, the set of data including the fixed length field 105 of the record 122 along with one iteration 123, i.e., one set of the one or more sets, of sub-fields 107 included in a set of variable length fields 106. An expanded record 124 can include data from fixed length fields 105 and ASCII values of sub-strings 109 generated as described herein. The dashed arrows extending from the fixed fields 105 in the top expanded record 124 in FIG. 3 are provided to illustrate that the fixed fields 105 each appear once in a selected record 122 from the source data 104, and that the respective sub-fields 107 occur, i.e., are repeated, one or more times (i.e., for one or more iterations 123) in the variable length field 106 in that selected record 122. That is, providing an occurrence or iteration 123 of a source data 104 record 122 means repeating the fixed fields 105 from the record 122 and, with each repetition (or occurrence or iteration 123) forming an expanded record 124 by providing one instance (or iteration 123) of content of sub-fields 107, rendered from corresponding sub-strings 109, specified for a variable length field 106 in the record 122.

The source computer 102 is typically what is referred to as a mainframe computer, e.g., running an operating system such as z/OS®, Linux®, z/VM®, z/VSE® and/or z/TPF, and a data store including source data 104 can be a relational database compatible with such operating system, such as IBM's DB2® database. Accordingly, querying the source data store can return source data 104 including fixed length fields 105 and variable length fields 106. The source data 104 can be provided to a target computer 112 via a network 103. Further, the target computer 112 may receive or use a layout description 118, e.g., information provided from a COBOL copybook or a portion thereof, obtained from the source computer 102, providing metadata about the source data 104. For example, the layout description 118 can define a layout of some or all of the source data 104, including fields 106 and sub-fields 107, including an order of occurrence, datatypes, lengths, and/or maximum number of occurrences, of sub-fields 107, as described above.

As mentioned above, a layout description 118 can be, for example, a copybook or a portion of a copybook such as can be conventionally provided for data from a mainframe computer. A mainframe copybook can be a flat file or the like that specifies a data layout or a data structure or structures for data used by computer programs, including databases or other programs that store data, on the mainframe computer. Accordingly, a layout description 118 can include data (i.e., metadata) about the data 104. For example, the layout description 118 can specify fields 105, 106 for one or more records 122 in data 104.

Using any suitable technique, the source data 104, e.g., variable length fields 106, can be converted to a hexadecimal data set, i.e., a string 108 of hexadecimal data. The string 108 can then be processed as described herein so that the source data 104, including one or more variable length fields 106 that include respective sub-fields 107, can be completely and accurately rendered in a set of target data 110. Specifically, and as explained further below, once a variable length field 106 is represented as a hexadecimal string 108, sub-strings 109 can be extracted from the hexadecimal string 108 corresponding to respective sub-fields 107 and representing one or more iterations 123 of the sub-fields 107 in the variable length field 106.

The target computer 112 can use the layout description 118 to identify data fields 105, 106, including sub-fields 107 (i.e., columns) in the source data 104, and can further receive or render the EBCDIC data as a hexadecimal string 108, e.g., a hexadecimal string 108 can be provided for a variable length field 106 that includes EBCDIC data, the variable length field 106 being indicated in a layout description 118 as having a variable length, e.g., a VARCHAR data type, representing the EBCDIC data; sub-fields 107 can be defined for the variable length field 106 as explained above.

EBCDIC, as noted above, is a known scheme for encoding data for use in mainframe computing environments. Hexadecimal data is data encoded according to a base 16, i.e., hexadecimal, numbering system. As is known, EBCDIC data, i.e., encoding according to EBCDIC, can be represented in hexadecimal format. Converting hexadecimal data to other formats, e.g., an encoding scheme according to American Standard Code for Information Interchange (ASCII), can also be conventionally performed.

FIG. 2 is a block diagram of an example set of source data 104 that could be described in a layout description 118. A set of source data 104 can include one or more types of records 122. Each record can include one or more fields 105, 106. Herein, a "type" of record 122 is defined by the one or more fields 105, 106 in the record 122. That is, records 122 of a same type include the respective fields 105, 106 defined as having same names, datatypes, and lengths. In one example, a definition for a type of record 122 is a definition of columns in a relational database table. Another name for a record 122 in this example could be a "row," i.e., each record 122 is a row in a relational database table. Thus, FIG. 2 illustrates three records 122 of a same type, but it is to be understood that in fact, records 122 of multiple types (e.g., multiple tables from a source database such as a DB2 database) could be provided in source data 104. For example, a record 122 could be a record for an employee, wherein fields 105, 106 could include employee first name, employee last name, employee identification number, employee home address, employee years of service, etc. Further, each type of records 122 in the source data 104, in this example, can define a different relational database table, i.e., each type of records 122 can be the data for a respective table of source data 104. For example, different types of records 122 in source data 106, e.g., tables, could include an employee table, a parts in inventory table, a finished products in inventory table, etc.

Fields 105 in the source data 104 are of datatypes for which a specified length is assigned in the source data 104. Variable fields 106, however are of datatypes, e.g., VARCHAR, having unspecified and variable lengths. The actual amount of data in a variable length field 106 in a record 122 determines the actual length of a hexadecimal string 108; different records 122 can have different lengths of data in a variable length field 106. As explained herein, it is possible to extract sub-strings 109 from a hexadecimal string 108 representing a variable length field 106 based in part on knowing lengths of the sub-strings 109 corresponding to sub-fields 107 in source data as described further below with respect to Table 4.

Based on lengths and datatypes of respective sub-fields 107 in a variable field 106, the target computer 112 can determine respective hexadecimal lengths of the sub-strings 109 in the hexadecimal string 108 representing respective sub-fields 107 in the variable length field 106. For example, the target computer 112 can store rules for determining a hexadecimal length corresponding to a sub-string 109 for a sub-field 107 defined in a layout description 118 to be present in a variable length field 106 represented in a hexadecimal string 108.

The layout description 118 can also specify a maximum possible number of times that a variable length field 106 can occur, i.e., a number of times that a single record 122 or row in the source data 106 can be expanded to multiple expanded records 124 in target data 110 because of a time or times that the field 106 repeats instances of sub-strings 109, i.e., a number of iterations 123 in the source data 106 record 122. For example, the layout description 118 could specify that "[field 106 name] occurs 573 times. In this example, therefore, the field 106 could include up to 573 iterations 123. Recall that the actual number of iterations 123 for a record 122 depends on the length of EBCDIC data in a variable length field 106 for a given set of record 122 and a number of iterations 123 in each record 122 is not specified.

Advantageously, as disclosed herein, it is possible to extract sub-strings 109 from a hexadecimal string 108 corresponding to sub-fields 107 in variable length fields 106 in source data 104 based simply on a layout description 118 declaration of a column name, a datatype for the column, a length for the column, and the maximum number of possible occurrences.

Determining the hexadecimal lengths of sub-fields 107 can include converting a sub-field 107 lengths to respective hexadecimal lengths, i.e., lengths of sub-strings 109 respectively corresponding to sub-fields 107. Then, a length of a hexadecimal string of one iteration 123, i.e., to be included in one expanded record 124, can be determined by adding together the lengths of the sub-strings 109.

Table 4 below gives an example of a set of rules that could be stored and used in the target computer 112 to determine hexadecimal lengths HL of sub-strings 109 (and hence of a hexadecimal string 108 or portion thereof for one iteration 123) in a record 122. In Table 4, a number SL represents a length, in bytes, of a sub-field 107 in the source data 104 variable length field 106. As can be seen, the length SL can be determined based on a declared length L for the sub-field 107 or column in the layout description 118.

TABLE 4

| Data type | SL (length, i.e., no. of bytes, in source data) | Example |
|---|---|---|
| Character | SL = L (i.e., length declared in copybook) | Copybook declaration is [ColumnName] PIC X(2), so L = 2, SL = 2 and HL = 4. |
| COMP | If 'L' = 1 to 4, No of Bytes = 2; If 'L' = 5 to 9, No of Bytes = 4; If 'L' = 10 to 18, No of Bytes = 8. | Copybook declaration is [ColumnName] PIC COMP 9(5), so L = 5, SL = 4 and HL = 8. |
| COMP3 | Floor(L/2 + 1) | Copybook declaration is [ColumnName] PIC COMP3 S9(7), soL = 7,, SL = 4, and HL = 8. |

Continuing the example of Table 1 above Table 5 below shows a calculation of L, SL, and HL:

TABLE 5

|  |  |  | L | SL | HL |
|---|---|---|---|---|---|
| Date | PIC | S9(9) | 9 | 4 | 8 |
| Time | PIC | S9(4) | 4 | 2 | 4 |
| Account | PIC | S9(4) | 4 | 2 | 4 |
| Desc | PIC | X(10) | 10 | 10 | 20 |

To take a simple example of extracting hexadecimal sub-strings 109 from the hexadecimal string 108 based on the defined lengths and source datatypes of the sub-strings 109, assume that a hexadecimal string 108, i.e., an EBCDIC representation of a variable length field 106, is provided as follows (and as previously illustrated above in Table 2):
01343EF1041F1A84000000000000C293A48501343E-F505491D90000000000000D98584
01343EF90677223D0000000000C79985859501343E-FA0408231000000000D7A499979385

For purposes of this example, we assume that the layout description 118 specifies four sub-fields 107 in the variable length field 106 (see Table 1), and further specifies that the variable length field 106 can occurs up to one-hundred times. Based on the source data 104 sub-fields 107 and their respective lengths specified in the layout description 118, four iterations 123 of the record 122 including the variable length field 106 can be rendered as follows, the commas delimiting between sub-strings 109 corresponding to individual sub-fields 107, and the double pipe symbols (||) delimiting between iterations 123 (i.e., respective sets of sub-strings 109 corresponding to the individual sub-fields 107 specified in the layout description 118) of the record 122, these delimiters being provided for the convenience of the reader of this document even though sub-strings 109 typically are not actually delimited: 01343EF1,041F,1A84, 000000000000C293A485||01343EF5,0549,1D90, 00000000000000D9 8584||01343EF9,0677,223D, 0000000000C799858595||01343EFA,0408,2310, 00000000D7A 499979385.

Once sub-strings 109 representing sub-fields 107 are identified and extracted from the hexadecimal string 108, any suitable technique can be used for converting at least some of the hexadecimal sub-strings 109 to a target format. Then the sub-strings 109, i.e., representing sub-fields 107 from the source data 104, can be output, e.g., stored in the target data store 114, in the target format along with other data, e.g., fields 105, from source data 104 as target data 110. The target data store 114 can then provide target data 110 representing the source data 104 to applications that could not otherwise read it, such as a Hadoop Distributed File System (HDFS).

Figure 4:
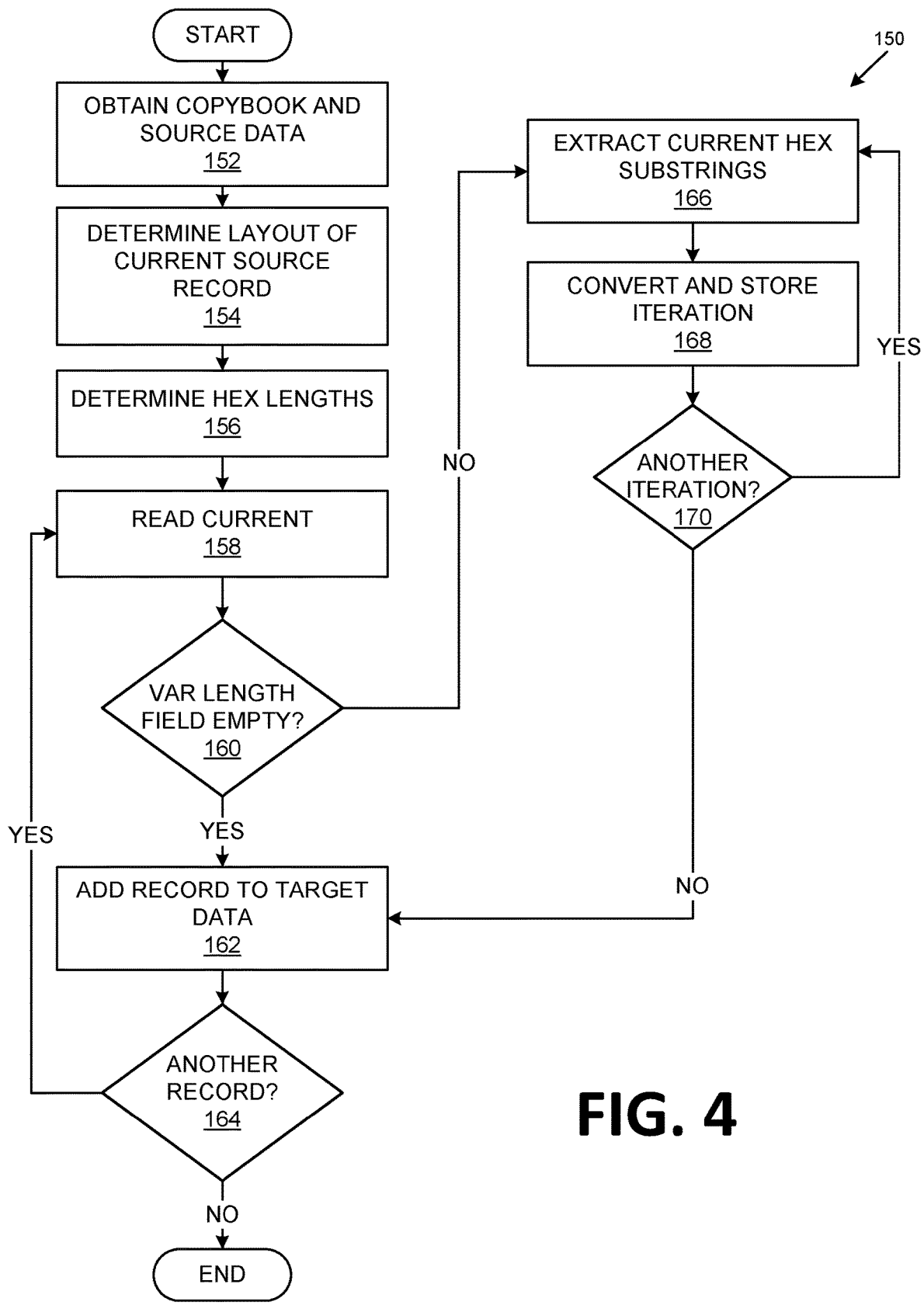
FIG. 4 is a flow diagram of an example process for interpreting and deploying data from a source computer in a target computer.

FIG. 4 is a flow diagram of an example process 150 for interpreting and deploying data 104 from a source computer 102 in a target computer 112. The process 150 can be implemented according to one or more computer programs, i.e., according to program instructions, executed in the target computer 112. Note that steps of the process 150 could be performed in a different order and/or certain steps could be omitted.

The process 150 can begin in a block 152, in which the target computer 112 obtains source data 104 and a layout description 118 specifying a layout of the source data 104. Further, the source data 104 can be processed, typically in the source computer 102, so that EBCDIC data, e.g., in a variable length field 106, is represented in a hexadecimal string 108, e.g., according to conventional techniques for so representing EBCDIC data.

Next, in a block 154, the target computer 112 determines, based on the layout description 118, a layout for the source data 104. The layout description 118 may provide a layout for one or more records in the source data 104. Determining a record 122 layout means that the target computer 112 identifies, for the record 122, fields 105, 106, e.g., field names, data types, and lengths. Further, the target computer identifies sub-fields 107 in variable length field 106, e.g., as described above, and can further determine a maximum number of occurrences of sets of sub-fields 107 in the variable length field 106.

Next, in a block 156, the target computer 112 determines hexadecimal lengths for sub-strings 109 corresponding to the respective sub-fields 107 in the record 122, e.g., as described above. Further, as described above, the target computer 112 then can determine a hexadecimal length of the sub-strings 109 for one iteration 123 of a record 122. Note that the target computer 112 could further then determine a number of iterations 103 by dividing the length of a hexadecimal string 108 by hexadecimal lengths of one iteration.

Next, in a block 158, the target computer 112 reads the current record 122, which includes obtaining a hexadecimal string 108 representing a variable length field 106, assuming that the variable length field is not null or empty.

Next, in a block 160, the target computer 112 determines whether a variable length field 106 of the current record 122 is empty. That is, if the variable length field 106 has a null value or no data, it is determined that the field 106 is empty and the process 150 proceeds to the block 162. Otherwise, the process 150 proceeds to the block 166.

In the block 162, the target computer 112 adds the current record 122, i.e., one or more iterations 123, to a set of target data 110 that can be stored by the target computer 112, e.g., added to a file system or database or the like to be consumed or used, e.g., by a HDFS.

In a block 164, which follows the block 162, the target computer 112 determines whether any further records 122 remain to be processed from the source data 104. If so, the process 150 returns to the block 158 to read a next current record. Otherwise, the process 150 ends.

In a block 166, which can follow the block 160, the target computer 112 extracts sub-strings 109 from the hexadecimal string 108 corresponding to sub-fields 107 in a current occurrence or iteration 123 of the variable length field 106 for the current record 122. To perform this extraction, the target computer 112 uses the hexadecimal lengths determined in the block 156 for one, i.e., a single, iteration of the respective sub-strings 109 corresponding to the respective sub-fields 107. Note that it is possible that an iteration 123 could be determined to have no substrings 109 associated with it. For example, assume that in Table 3 above, there was a record 122 for "Edward" between the records 122 "Cathy" and "Joe," and that the sub-fields for Edward were empty, i.e., no data was provided. In such a case, the target computer 112 in the block 166 would not extract any hexadecimal substrings 109, i.e., there would be no hexadecimal substrings 109 to extract for the current iteration. Thus, in such case, the process 150 would store the fixed length fields 105 for the current iteration 123, and would proceed to the block 164.

In a block 168, which can follow the block 166, the target computer 112 converts the sub-strings 109 for the current iteration 123 identified in the block 166 to a target format, e.g., ASCII. Any suitable technique for converting data from the first format to the second format, e.g., such as is known for converting hexadecimal data to ASCII, etc., could be used. The current iteration 123 can then be stored, e.g., in a memory of the target computer 112, to be added to a set of target data with other iterations 123 of the current record 122, if any, when the block 162, described above, is next visited.

Next, in a block 170, the target computer 112 determines whether further iterations 123 remain for the current record 122. That is, if it is determined that the entire hexadecimal string 108 obtained in the block 158 has not been processed, then it is determined that one or more further iterations 123 remain. If so, the process 150 returns to the block 166. Otherwise, the process 150 proceeds to the block 162. As explained above, the block 164 follows the block 162, and the process 150 can either end or return to the block 158 following the block 164.

The source computer 102 and the target computer 112 can communicate via any suitable mechanisms, e.g., a communication network 110 as illustrated in FIG. 1. The communication network 110 can include one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks 110 include wireless communication networks 110 (e.g., using Bluetooth®, Bluetooth® Low Energy (BLE), IEEE 802.11, local area networks (LAN) using Ethernet or the like, and/or wide area networks (WAN), including the Internet, providing data communication services.

Computers such as the source computer 102 and the target computer 112 can include a processor and a memory such as are known. A memory includes one or more forms of computer readable media, and stores instructions executable by the vehicle computer for performing various operations, including as disclosed herein. For example, the computer typically includes at least one processor and one memory. In some examples, a combination of processor(s), ASIC(s), and/or FPGA circuits may be included in a computer. The memory can be of any type, e.g., hard disk drives, solid state drives, servers, or any volatile or non-volatile media. The memory can store the collected data sent from the sensors. The memory can be a separate device from the computer, and the computer can retrieve information stored by the memory via a network Alternatively or additionally, the memory can be part of the computer, e.g., as a memory of the computer.

Computer executable instructions may be compiled or interpreted from computer programs created using a variety of programming languages and/or technologies, including, without limitation, and either alone or in combination, Cobol, Python, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes 150, including one or more of the processes 150 described herein. Such instructions and other data may be stored and transmitted using a variety of computer readable media. A file in a networked device is generally a collection of data stored on a computer readable medium, such as a storage medium, a random access memory, etc. A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, any other physical medium with patterns of holes, a RAM, a PROM, an EPROM, a FLASH EEPROM, any other memory chip or cartridge, or any other medium from which a computer can read.

Use of "in response to," "based on," and "upon determining" herein indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described. The present invention is intended to be limited only by the following claims.

The invention claimed is:

1. A method, comprising:

receiving, in a first computer from a second computer that stores source data rendered as a string of hexadecimal data representing a set of Extended Binary Coded Decimal Interchange Code (EBCDIC) data, source data in EBCDIC format and a data layout description defining a record in the source data that includes a plurality of fields, wherein the plurality of fields included in the record includes a variable field that includes plurality of sub-fields such that respective sub-fields occur more than once in the record;

determining respective hexadecimal lengths of the fields and sub-fields based on a source data length of each field and a source datatype of each field and sub-field from the data layout description received with the source data;

extracting hexadecimal sub-strings from the hexadecimal string based on the hexadecimal lengths and source datatypes of the fields and sub-fields;

converting at least some of the hexadecimal sub-strings to a target format for a first computer that is configured to use data in the target format;

storing the sub-strings as a set of data in the target format; and providing at least some of the data in the target format from the first computer to an application that accepts data in the target format.

2. The method of claim 1, wherein determining the hexadecimal lengths of the fields includes converting a source data field length to a hexadecimal length based on a specified length of the respective source data field and a stored rule for converting a number of bytes of the source data field to a hexadecimal length.

3. The method of claim 1, further comprising determining respective hexadecimal lengths of one occurrence in the plurality of fields in the hexadecimal string based on the respective hexadecimal lengths of fields in the respective records of the plurality of records.

4. The method of claim 3, further comprising, after extracting a first set of sub-strings from the hexadecimal string based on the hexadecimal length of the one occurrence, then extracting a second set of sub-strings from the hexadecimal string based on the hexadecimal length of the one occurrence.

5. The method of claim 4, wherein extracting the sub-strings from the hexadecimal string based on the hexadecimal lengths of the one occurrence includes:

extracting the first set of the sub-strings based on the hexadecimal length of the one occurrence, determining that processing of the first set of sub-strings is complete based on the hexadecimal length of the one occurrence, and extracting the second set of the sub-strings based on the hexadecimal lengths of the one occurrence;

wherein converting at least some of the sub-strings to the target format includes converting the second sub-strings to the target format.

6. The method of claim 1, wherein the target format is American Standard Code for Information Interchange (ASCII).

7. The method of claim 1, wherein outputting the sub-strings in the target format includes storing the sub-strings as one or more records in a relational database.

8. The method of claim 1, wherein outputting the sub-strings in the target format includes storing the sub-strings as one or more records in a Hadoop Distributed File System.

9. A system, comprising a first computer that includes a processor a memory, the memory storing instructions executable by the processor for:
receiving from a second computer that stores source data rendered as a string of hexadecimal data representing a set of Extended Binary Coded Decimal Interchange Code (EBCDIC) data, source data in EBCDIC format and a data layout description defining a record in the source data that includes a plurality of fields, wherein the plurality of fields included in the record includes a variable field that includes plurality of sub-fields such that respective sub-fields occur more than once in the record;
determining respective hexadecimal lengths of the fields and sub-fields based on a source data length of each field and a source datatype of each field and sub-field from the data layout description received with the source data;
extracting hexadecimal sub-strings from the hexadecimal string based on the hexadecimal lengths and source datatypes of the fields and sub-fields;
converting at least some of the hexadecimal sub-strings to a target format for the first computer that is configured to use data in the target format;
storing the sub-strings as a set of data in the target format; and
providing at least some of the data in the target format from the first computer to an application that accepts data in the target format.

10. The system of claim 9, wherein determining the hexadecimal lengths of the fields includes converting a source data field length to a hexadecimal length based on a specified length of the respective source data field and a stored rule for converting a number of bytes of the source data field to a hexadecimal length.

11. The system of claim 9, the instructions further including instructions for determining respective hexadecimal lengths of one occurrence in the plurality of fields in the hexadecimal string based on the respective hexadecimal lengths of fields in the respective records of the plurality of records.

12. The system of claim 11, the instructions further including instructions for, after extracting a first set of sub-strings from the hexadecimal string based on the hexadecimal length of the one occurrence, then extracting a second set of sub-strings from the hexadecimal string based on the hexadecimal length of the one occurrence.

13. The system of claim 12,
wherein extracting the sub-strings from the hexadecimal string based on the hexadecimal lengths of the one occurrence includes:
extracting the first set of the sub-strings based on the hexadecimal length of the one occurrence,
determining that processing of the first set of sub-strings is complete based on the hexadecimal length of the one occurrence, and
extracting the second set of the sub-strings based on the hexadecimal lengths of the one occurrence;
wherein converting at least some of the sub-strings to the target format includes converting the second sub-strings to the target format.

14. The system of claim 9, wherein the target format is American Standard Code for Information Interchange (ASCII).

15. The system of claim 9, wherein outputting the sub-strings in the target format includes storing the sub-strings as one or more records in a relational database.

16. The system of claim 9, wherein outputting the sub-strings in the target format includes storing the sub-strings as one or more records in a Hadoop Distributed File System.

* * * * *